(12) United States Patent
Cheng et al.

(10) Patent No.: US 8,880,259 B2
(45) Date of Patent: Nov. 4, 2014

(54) ELECTRIC POWER DISSIPATION CONTROL

(71) Applicants: Bing Cheng, West Bloomfield, MI (US); Goro Tamai, West Bloomfield, MI (US)

(72) Inventors: Bing Cheng, West Bloomfield, MI (US); Goro Tamai, West Bloomfield, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 59 days.

(21) Appl. No.: 13/687,747

(22) Filed: Nov. 28, 2012

(65) Prior Publication Data

US 2013/0151050 A1 Jun. 13, 2013

Related U.S. Application Data

(60) Provisional application No. 61/570,086, filed on Dec. 13, 2011.

(51) Int. Cl.

| | | |
|---|---|---|
| B60L 1/00 | (2006.01) | |
| B60L 1/08 | (2006.01) | |
| B60L 7/10 | (2006.01) | |
| B60L 7/22 | (2006.01) | |
| B60W 20/00 | (2006.01) | |
| B60L 3/00 | (2006.01) | |
| B60L 7/28 | (2006.01) | |
| B60L 15/20 | (2006.01) | |
| B60L 11/18 | (2006.01) | |

(52) U.S. Cl.
CPC ........ B60W 20/1062 (2013.01); *B60L 2210/10* (2013.01); *Y02T 10/7044* (2013.01); *Y02T 10/7216* (2013.01); *B60L 2220/14* (2013.01); *B60L 2240/545* (2013.01); *Y10S 903/903* (2013.01); *Y02T 10/7005* (2013.01); *Y02T 10/642* (2013.01); B60L 3/0046 (2013.01); B60L 7/28 (2013.01); *Y02T 10/705* (2013.01); *B60L 2240/423* (2013.01); *B60L 2240/421* (2013.01); B60L 15/2009 (2013.01); B60L 11/1861 (2013.01); B60L 11/1805 (2013.01)
USPC ..... 701/22; 701/36; 180/65.265; 180/65.285; 903/903

(58) Field of Classification Search
USPC ........ 701/22, 36, 69, 70, 81; 180/65.1, 65.21, 180/65.225, 65.24, 65.265, 65.275, 65.285; 318/51, 65, 362, 375, 376, 382
See application file for complete search history.

(56) References Cited

U.S. PATENT DOCUMENTS

| | | | |
|---|---|---|---|
| 6,121,740 A | 9/2000 | Gale et al. | |
| 6,196,344 B1 * | 3/2001 | Tamor | 180/65.25 |
| 2005/0035676 A1 | 2/2005 | Rahman et al. | |

FOREIGN PATENT DOCUMENTS

WO 2010042517 A1 4/2010

OTHER PUBLICATIONS

Stulrajter et al.; Permanent Magnets Synchronous Motor Control Theory, Journal of Electrical Engineering., vol. 58, No. 2, Mar. 2007, pp. 79-84, XP002712615.
International Search Report and Written Opinion dated Oct. 14, 2013 for International Application No. PCT/US2012/067237, International Filing Date Nov. 30, 2012.

* cited by examiner

*Primary Examiner* — Thomas Tarcza
*Assistant Examiner* — Edward Pipala
(74) *Attorney, Agent, or Firm* — Ralph F. Smith

(57) ABSTRACT

A method and apparatus for controlling an electric motor. An electric motor apparatus has an electric motor with motor stator windings, a battery, battery control module coupled to the battery and configured to monitor and detect a state of the battery, and a motor control unit coupled to the battery and the batter control module and being configured to select an operation of the electric motor based on a signal from the battery control module representing the state of the battery. The motor control unit selects a normal motor control operation, a power dissipation motor control operation, or a discharge operation. During the power dissipation motor control operation, power from brake torque is dissipated in the motor stator windings of the electric motor.

20 Claims, 4 Drawing Sheets

ELECTRIC POWER DISSIPATION CONTROL

CROSS REFERENCE TO RELATED APPLICATION

This application claims priority from U.S. Provisional Ser. No. 61/570,086, filed Dec. 13, 2011.

FIELD

The present disclosure relates to the field of hybrid electric vehicles (HEV) and battery electric vehicles (BEV), and more particularly to an electric power dissipation system and method for hybrid electric and battery electric vehicles.

BACKGROUND

Permanent magnet synchronous motors (PMSM) are widely used in hybrid electric vehicles and battery electric vehicles. Among the permanent magnet synchronous motors, interior permanent magnet (IPM) motors are the most commonly used motors for HEV/BEV applications due to their high power density, high efficiency and wide speed range.

When a hybrid electric vehicle or battery electric vehicle is in an electric mode (i.e., the mode when it is only running the electric motor without the assistance of an internal combustion engine), the vehicle needs to give the driver similar drive performance as compared to conventional vehicles that only use an internal combustion engine. One of the desired features for hybrid electric and battery electric vehicles is to have a coast-down performance similar to that of conventional vehicles. This requires the electric motor to provide certain brake torque to the vehicle when the accelerator pedal is released. In other words, the mechanical power is converted to electric power and fed back to the battery. This is also called coast-down regenerative braking. Regenerative braking is an energy recovery mechanism that slows down a vehicle by converting its kinetic energy into another form—in the case of hybrid electric and battery electric vehicles, the kinetic energy is converted into electrical energy. In conventional braking systems (i.e., for internal combustion engine vehicles), by contrast, excess kinetic energy is converted into heat by friction in the brake linings; therefore, the excess energy is wasted in these vehicles. For hybrid electric and battery electric vehicles, however, the excess energy can be stored in a battery or bank of capacitors for later use.

However, under certain conditions, (e.g., when the state of charge (SOC) of the battery is high or the battery temperature is hot/cold), regeneration current is not allowed back to the battery. Battery state of charge is the equivalent of a fuel gauge for the battery in a hybrid electric or battery electric vehicle, which measures how fully charged the battery is. Thus, when the state of charge of the battery is high or the battery temperature is hot/cold, the amount of power that can be accepted by the battery is met or exceeded. As such, there is the possibility of detrimental effects to the battery if more power is fed back to it.

Under certain conditions such as e.g., when the SOC is nearly full or the battery temperature is high, if coast-down regeneration is not allowed, the electric motor suddenly has to remove all of its braking torque to prevent the current (i.e., energy converted from kinetic energy) from charging the battery. This affects the smoothness of the driving experience as perceived and felt by the driver. This will give the driver inconsistent drive performance when the above conditions exist compared to when they do not. Thus, there is a need to allow regenerative braking in hybrid electric and battery electric vehicles under all circumstances even when the regeneration current cannot be fed back to the battery.

SUMMARY

In one form, the present disclosure provides a motor control apparatus for a hybrid electric vehicle comprising an electric motor. The apparatus comprises a battery control module coupled to a battery and configured to monitor and detect a state of the battery; and a motor control unit coupled to the battery and the battery control module, said motor control unit being configured to selects one of a normal motor control operation, a power dissipation motor control operation, or a discharge operation based on the state of the battery received from the battery control module. During the power dissipation motor control operation, power from brake torque is dissipated in stator windings of the electric motor.

The present disclosure also provides a method of operating an electric motor of a hybrid electric vehicle. The method comprises detecting, at a battery control module, a state of an electric battery within the vehicle; and selecting, at a mode control unit, one of a normal operation, power dissipation operation, or discharge operation of the electric motor based on the detected state of the battery. During the power dissipation operation, power from brake torque is dissipated in stator windings of the electric motor.

As disclosed herein, the state of the battery includes a state of charge of the battery, a battery temperature, and/or a fault condition. The motor control unit selects the normal motor control operation if the state of charge of the battery is below a predetermined value and selects the power dissipation motor control operation if the state of charge of the battery is above a predetermined value.

Further areas of applicability of the present disclosure will become apparent from the detailed description and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
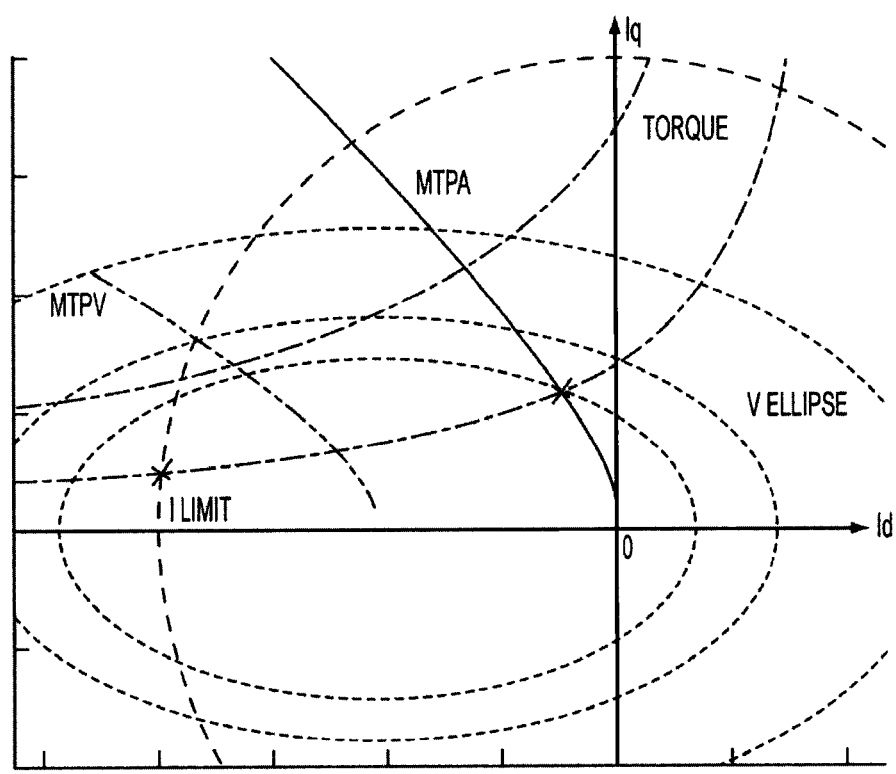
FIG. 1 illustrates an interior permanent magnet operating plane.

Described herein is a mechanism to maintain consistent drive performance for hybrid electric and battery electric vehicles (as compared to conventional vehicles with internal combustion engines) under constrained conditions. The disclosed mechanism provides a path to dissipate power generated by braking torque without generating any power back to the battery. In addition, under certain conditions, the mechanism can even draw current from the battery while still producing the desired electric motor braking torque. In some instances, it is desirable to have current drawn from the battery to discharge it (to prevent a battery overcharge condition)

or to warm it up (i.e., if the battery charge power limit is low because it is cold) so that the battery can provide full power more quickly.

Embodiments described herein dissipate the power generated by braking torque through the electric motor's stator windings, while the motor is providing the required electric motor braking torque and without charging the battery. In the synchronous frame, the steady-state voltage equation of an interior permanent magnet motor can be expressed as:

$$V_{ds} = R_s i_{ds} - \omega_r L_q i_{qs} \quad (1)$$

$$V_{qs} = R_s i_{qs} + \omega_r (L_d i_{ds} + \lambda_{PM}) \quad (2)$$

Where $v_{ds}$, $v_{qs}$, $i_{ds}$ and $i_{qs}$ are the motor currents and voltages in the d-q reference frame, $\omega_r$ is the rotor electrical frequency, $L_d$ and $L_q$ are the stator d- and q-axis inductances, $R_s$ is the stator resistance, and $\lambda_{PM}$ is the permanent-magnet flux linkage.

The motor torque output is given by:

$$T_{em} = (3P/2)(\lambda_{PM} i_q + (L_d - L_q) i_d i_q) \quad (3)$$

Where P is the number of pairs of poles of the motor.

The motor current is limited by $i_{max}$:

$$i_{ds}^2 + i_{qs}^2 < i_{max}^2 \quad (4)$$

With the motor model defined in equations (1) and (2) for a given torque, $T_{em}$, the minimum current is the shortest distance from the torque curve to the origin, $i = \sqrt{i_{ds}^2 + i_{qs}^2}$. For a given torque T, the minimum current is the shortest distance from the torque curve to the origin in the current d-q coordinate and the Maximum Torque Per Ampere (MTPA) curve can be obtained as:

$$i_d = \frac{I_{PM}}{2(L_q - L_d)} - \sqrt{\frac{\lambda_{PM}^2}{4(L_d - L_q)^2} + i_{qs}^2} \quad (5)$$

Referring to FIG. 1, the maximum torque per ampere (MTPA) curve, maximum torque per volt (MTPV) curve, current limit circle, I limit, and torque curves are plotted. The voltage ellipses for the motors (1) and (2) are also plotted. For any given torque, DC bus voltage, and motor speed, there exists a torque curve and a voltage ellipse curve as shown, for example, in FIG. 1. The torque curve intercepts with the voltage ellipse and the boundaries such as the MTPA curve, MTPV curve and current limit circle. A unique set of optimal reference currents $i_d$ and $i_q$ within the optimal operational plane can be determined.

For a given torque command, the motor current $i_d$ and $i_q$ can be chosen at any point along the torque curve. However, the optimal (i.e., minimum) motor current is at the intersection between the MTPA and the torque curve as shown in FIG. 1. To maintain the same motor torque output, it has been determined that more current will dissipate more power, or losses, in the motor stator windings. Thus, the present disclosure aims to maintain the same torque output with the more possible current (note: if maximum possible power needs to be dissipated, then the highest possible current $i_{max}$ on the same torque curve will be needed). The total power dissipation in the motor stator winding is:

$$P = 3R_s(i_{ds}^2 + i_{qs}^2) \quad (6)$$

And the power from the battery, or DC power supply is:

$$P = V_{dc} I_{dc} \quad (7)$$

The maximum power dissipation is limited by the motor current limit, $i_{max}$ (i.e., the current limit circle radius). For a given torque command, the maximum power dissipation current command is at the intersection of the current limit circle and the torque curve as shown in FIG. 1. The intersection point ($i_{d\_max}$, $i_{q\_max}$) is determined by equations (3) and (4) set forth above.

Figure 2:
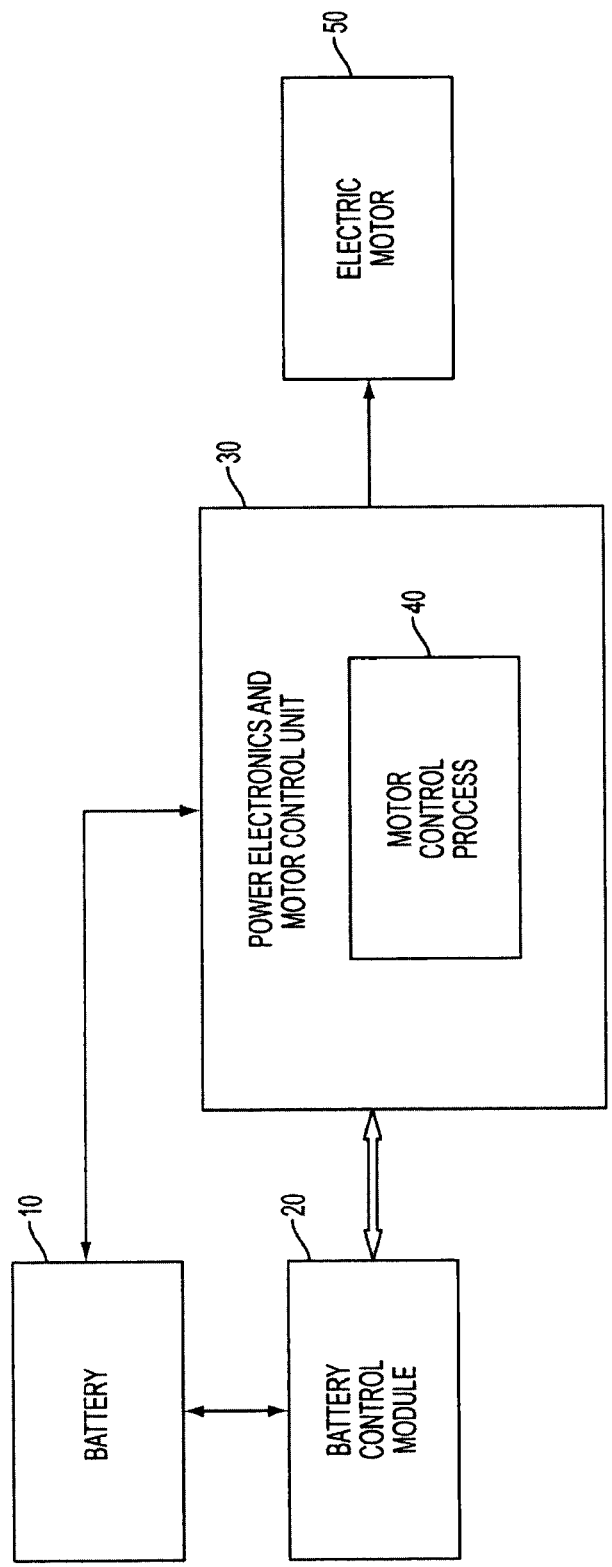
FIG. 2 illustrates a schematic of the electrical system of a hybrid electric vehicle.

FIG. 2 illustrates an electrical system overview of a hybrid electric vehicle. The electrical system includes a battery 10, which is an electric battery, connected to a battery control module 20 and a power electronics and motor control unit 30. The battery control module 20 monitors and controls the functions of the battery 10. For example, the battery control module 20 can detect the state of charge of the battery and/or the battery's temperature. The power electronics and motor control unit 30 contains motor control process 40 (described below) and is also connected to an electric motor 50, which can be for example, an interior permanent magnet motor.

Figure 3:
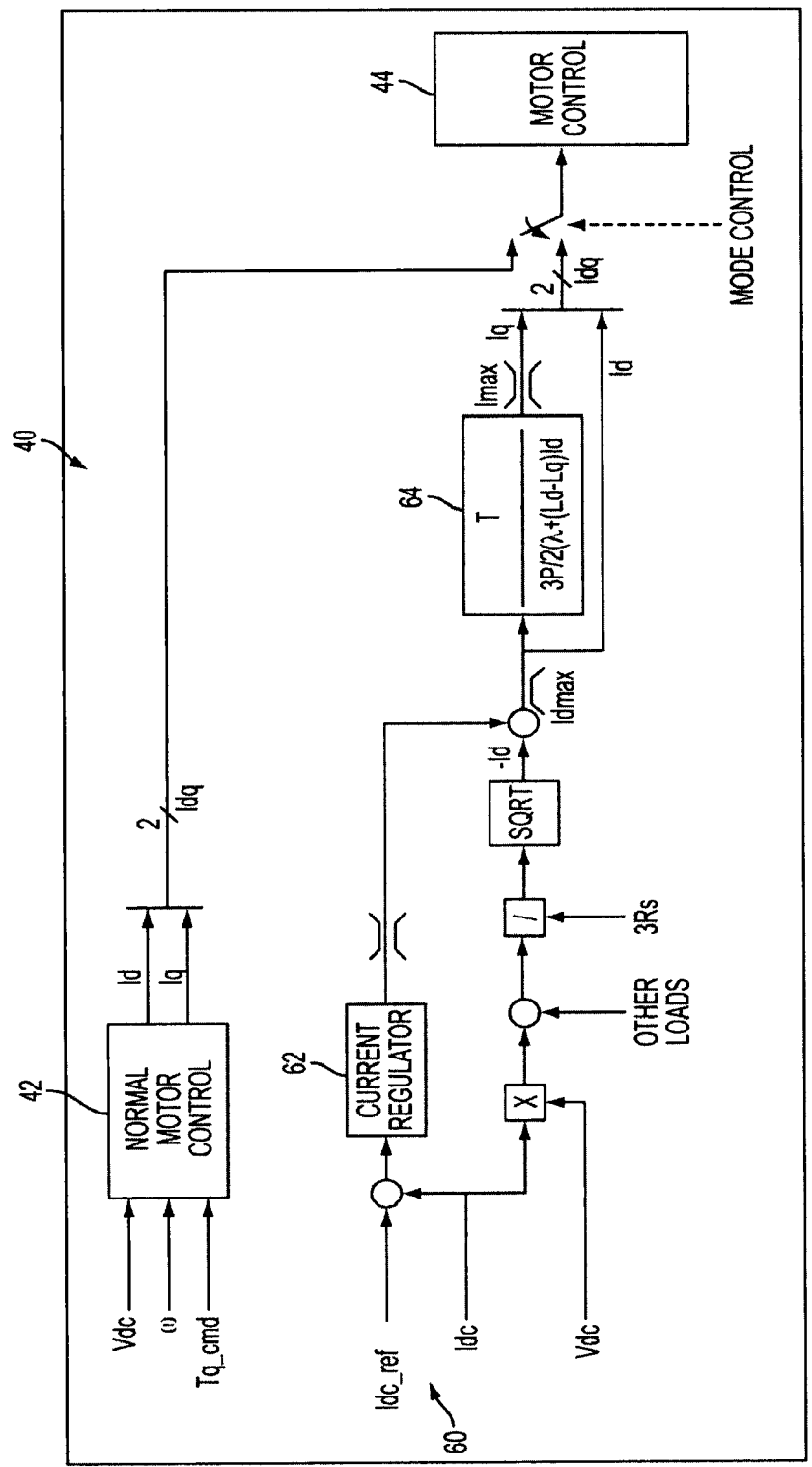
FIG. 3 illustrates a block diagram of the control process having the electric power dissipation process in accordance with the present disclosure.

FIG. 3 illustrates an example motor control process 40 having a power dissipation process 60 in accordance with the present disclosure. In a desired embodiment, the process 40 is implemented in software operated by control unit 30 or other processor. The power dissipation process 60 includes, among other processing, a current regulator process 62 and $i_q$ process 64. The current regulator process 62 (which can be, for example, a proportional integral regulator) tries to regulate the DC current feedback to the current reference value. The DC bus voltage $V_{dc}$ and current feedbacks $i_{ds}$ are sensed and the DC power consumption P can be calculated by equation (7). Depending on the $i_{dc\_ref}$ value, either zero or a positive value for more power consumption by the motor and other loads in the system, the DC current feedback is compared with the reference value and fed to the current regulator. The "other loads" could be, for example, a DC/DC converter (e.g., 300V to 12V), heater or cooler, and all other auxiliary loads that are connected to the high voltage DC bus. The auxiliary loads can be factored into the determination by use of load reference models or look-up tables for a more accurate calculation. The commanded $i_d$ is calculated by equation (6) and is compensated by the output of the current regulator process 62. The commanded $i_d$ can also be obtained by using look-up tables that can take motor/vehicle parameter uncertainty and other vehicle power loads into consideration to get better accuracy of the power consumption.

Figure 4:
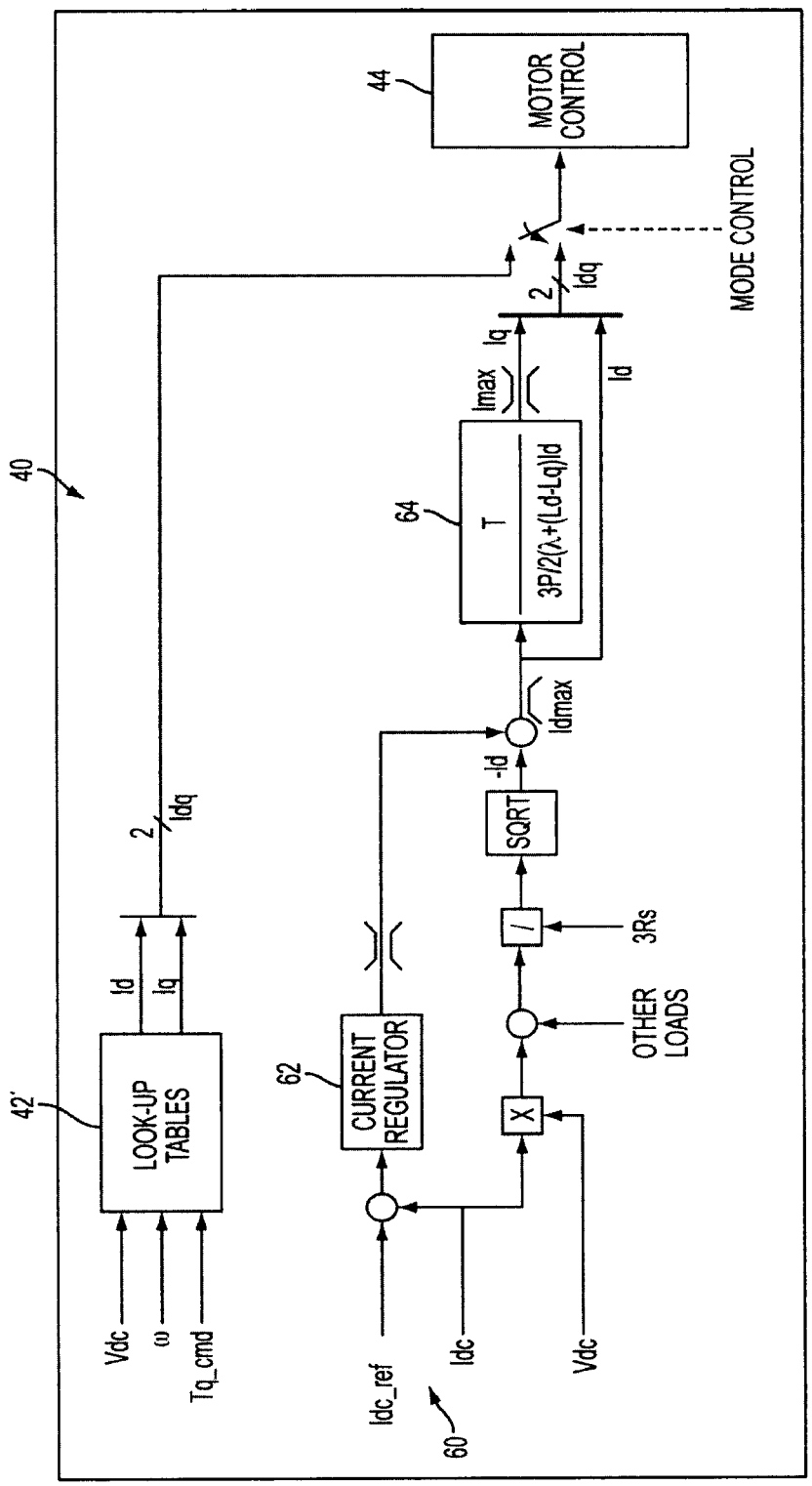
FIG. 4 illustrates a block diagram of the control process having the electric power dissipation process in accordance with another embodiment of the present disclosure.

The $i_d$, $i_q$ calculation for normal motor torque control (i.e., when power dissipation mode is not needed) is performed in process 42. It should be appreciated that the process 42 can also be implemented by using a look-up table 42' (as shown in FIG. 4) with calibration entries to accommodate the uncertainty of the motor and other loads in the vehicle; this may allow for a more accurate calculation. The motor stator resistance value is also compensated for by stator temperature feedback. In other words, the motor stator resistance is compensated for by stator temperature feedback. Thus, for more accurate calculations, a sensor may be used to sense the temperature and calculate the resistance based on that temperature. For a given $i_d$ and commanded torque, the commanded $i_q$ is calculated by equation (3). $I_d$ and $i_q$ are limited by the intersection point of torque and current limit circle ($i_{d\_max}$, $i_{q\_max}$). Depending on whether the drive system is in the power dissipation mode or not, a motor control process 44 will take input either the normal current command or the disclosed novel power dissipation current command.

According to the present disclosure, the battery control module 20 monitors the state of the battery 10 (e.g., SOC or temperature of the battery). Depending on the state of the battery, the motor control process 40 will switch the operation of the motor control process 44 to use either use normal motor control (i.e., under a normal battery condition) or the disclosed power dissipation motor control process in accordance with the disclosed principles (i.e., under a constrained battery condition). By dissipating the power in the motor stator windings, the vehicle can maintain the coast-down braking torque without charging the battery, which can improve vehicle drive performance when power limits are constrained. The motor control process can not only produce zero charging current to the battery, it can also follow a prescribed commanded DC discharge current to dissipate more power from the battery. This accelerates the warm-up process of the battery or prevent a battery overcharge condition.

The disclosed embodiments can also be used for transient driveline control when the battery charge power is constrained. For example, for active driveline damping control, the battery is often used as a buffer to sink and source electric motor power to damp driveline oscillations. If the battery charge power is compromised, the damping control cannot function properly. With the power dissipation control process disclosed herein, a portion of the damping control can be maintained even under adverse conditions.

What is claimed is:

1. A motor control apparatus for a hybrid electric vehicle comprising an electric motor, said apparatus comprising:
a battery control module coupled to a battery and configured to monitor and detect a state of the battery; and
a motor control unit coupled to the battery and the battery control module, said motor control unit being configured to select one of a normal motor control operation, a power dissipation motor control operation, or a discharge operation based on the state of the battery received from the battery control module, and wherein during the power dissipation motor control operation, power from brake torque is dissipated in stator windings of the electric motor without generating any power back to the battery.

2. The motor control apparatus of claim 1, wherein the motor control unit comprises a processor, wherein the processor is programmed to execute a power dissipation process having a DC current regulation process.

3. The motor control apparatus of claim 1, wherein the state of the battery includes a state of charge of the battery.

4. The motor control apparatus of claim 3, wherein the motor control unit selects the normal motor control operation if the state of charge of the battery is below a predetermined value and selects the power dissipation motor control operation if the state of charge of the battery is above a predetermined value.

5. The motor control apparatus of claim 1, wherein the state of the battery includes a battery temperature.

6. The motor control apparatus of claim 1, wherein the state of the battery includes a fault condition.

7. The motor control apparatus of claim 1, wherein the total power dissipated in the stator windings is equal to $3R_s(i_{ds}^2+i_{qs}^2)$, where $R_s$ is the stator resistance and $i_{ds}$ and $i_{qs}$ are motor currents in a d-q reference frame.

8. The motor control apparatus of claim 1, wherein the motor control unit determines a current command for a given torque in accordance with the equation:

$$T_{em}=(3P/2)(\lambda_{PM}i_q+(L_d-L_q)i_d i_q),$$

wherein $T_{em}$ is torque, $\lambda_{PM}$ is the motor rotor permanent-magnet flux linkage, $i_d$ and $i_q$ are stator motor currents in a d-q reference frame, and $L_d$ and $L_q$ are stator d- and q-axis inductances.

9. The motor control apparatus of claim 1, wherein the electric motor is an interior permanent magnet motor.

10. The motor control apparatus of claim 1, wherein the discharge operation draws current from the battery.

11. The motor control apparatus of claim 1, wherein auxiliary loads in the motor control apparatus are determined by look-up tables or load reference models.

12. The motor control apparatus of claim 1, wherein during the normal motor control operation, power from brake torque is returned to the battery.

13. A method of operating an electric motor of a hybrid electric vehicle, said method comprising:
detecting, at a battery control module, a state of an electric battery within the vehicle; and
selecting, at a mode control unit, one of a normal operation, power dissipation operation, or discharge operation of the electric motor based on the detected state of the battery,
wherein during the power dissipation operation, power from brake torque is dissipated in stator windings of the electric motor without generating any power back to the battery.

14. The method of claim 13, further comprising sending a signal based on the state of the electric battery from the battery control module to the mode control unit.

15. The method of claim 13, wherein the state of the battery includes a state of charge of the battery.

16. The method of claim 15, wherein the motor control unit selects the normal motor control operation if the state of charge of the battery is below a predetermined value and selects the power dissipation motor control operation if the state of charge of the battery is above a predetermined value.

17. The method of claim 13, wherein the state of the battery includes one of a battery temperature and a fault condition.

18. The method of claim 13 further comprising a DC current regulator process that regulates DC current to DC current reference values, and therefore controls the power dissipation inside stator windings of the motor.

19. The method of claim 13, further comprising the step of calculating a current command for a given torque in accordance with the following equation:

$$T_{em}=(3P/2)(\lambda_{PM}i_q+(L_d-L_q)i_d i_q),$$

wherein $T_{em}$ is torque, $\lambda_{PM}$ is the rotor permanent-magnet flux linkage, $i_d$ and $i_q$ are stator motor currents in a d-q reference frame, and $L_d$ and $L_q$ are stator d- and q-axis inductances.

20. The method of claim 13, wherein the discharge operation draws current from the electric battery.

* * * * *